United States Patent [19]

Osegowitsch et al.

[11] Patent Number: 4,480,901

[45] Date of Patent: Nov. 6, 1984

[54] ARRANGEMENT FOR AND A METHOD OF PROCESSING PHOTOSENSITIVE ARTICLES

[75] Inventors: Viktor Osegowitsch, Taufkirchen; Jürgen Leuchter, Tutzing, both of Fed. Rep. of Germany

[73] Assignee: Agfa-Gevaert Aktiengesellschaft, Leverkusen, Fed. Rep. of Germany

[21] Appl. No.: 420,854

[22] Filed: Sep. 21, 1982

[30] Foreign Application Priority Data

Nov. 27, 1981 [DE] Fed. Rep. of Germany ....... 3147187

[51] Int. Cl.[3] ........................... G03B 3/06; G03B 3/08

[52] U.S. Cl. ..................................... 354/320; 354/298; 354/324; 137/392

[58] Field of Search ............... 354/298, 324, 320, 321, 354/322; 137/392

[56] References Cited

U.S. PATENT DOCUMENTS

| | | | |
|---|---|---|---|
| 3,905,698 | 9/1975 | Schroter et al. | 354/298 |
| 4,021,832 | 5/1977 | Krehbiel et al. | 354/298 |
| 4,057,817 | 11/1977 | Korb et al. | 354/298 |
| 4,057,818 | 11/1977 | Gaskell et al. | 354/324 |
| 4,134,663 | 1/1979 | Laar et al. | 354/298 |
| 4,284,343 | 8/1981 | Junghanns | 354/324 |
| 4,293,211 | 10/1981 | Kaufmann | 354/324 |

FOREIGN PATENT DOCUMENTS

| | | |
|---|---|---|
| 1522856 | 10/1969 | Fed. Rep. of Germany . |
| 2557253 | 6/1977 | Fed. Rep. of Germany . |
| 2815162 | 10/1979 | Fed. Rep. of Germany . |

*Primary Examiner*—A. A. Mathews

*Attorney, Agent, or Firm*—Peter K. Kontler

[57] ABSTRACT

A developing apparatus for photosensitive material has a processing bath and a conveying system for advancing photosensitive material through the path. A supply vessel accommodates a regenerating solution for the bath and a flow regulating device such as a pump or a valve is provided to regulate the admission of the regenerating solution into the bath. A sensing system senses the surface area of the photosensitive material advanced into the bath and supplies this information to a computer which then calculates the quantity of regenerating solution to be supplied to the bath. The control unit operates the flow regulating device at intervals in order to deliver the calculated quantity of regenerating solution to the bath. A measuring unit connected with the computer measures the actual quantity of regenerating solution supplied to the bath during operation of the flow regulating device. The actual and calculated quantities of the regenerating solution are compared by the computer which performs a correction in these quantities are different. The computer may also be programmed to generate an alarm if corrections must be made too frequently or if the difference between the actual and calculated quantity of the regenerating solution is excessively large.

52 Claims, 2 Drawing Figures

ARRANGEMENT FOR AND A METHOD OF PROCESSING PHOTOSENSITIVE ARTICLES

BACKGROUND OF THE INVENTION

The invention relates generally to a processing arrangement and method, especially for developing photosensitive articles.

More particularly, the invention relates to an arrangement for and a method of regenerating a processing bath.

It is known to add a regenerating solution to a processing bath in a photographic developing apparatus in order to maintain the consistency or concentration of the bath constant. The regenerating solution compensates for the changes which occur in the processing bath due to use or aging. Such an apparatus generally has sensing devices which sense the surface areas of the photosensitive articles advanced into the bath. The quantity of regenerating solution required is automatically calculated from the surface areas and this quantity is added to the bath via a regulating device.

A variety of arrangements for controlling the addition of the regenerating solution to the processing bath exists. These arrangements are connected to the sensing devices which measure the surface areas of the photosensitive articles and control the addition of the regenerating solution to the bath in dependence upon the measurements of the surface areas. The introduction of the regenerating solution into the bath is usually performed by a pump.

In one conventional arrangement, the required quantity of the regenerating solution is added to the bath by operating the pump for a predetermined number of strokes. It is assumed that a fixed quantity of the regenerating solution is discharged into the bath for each stroke of the pump.

It is also known to add the regenerating solution to the bath via a solenoid valve. On the assumption that a fixed quantity of the regenerating solution will flow through the valve per unit of time, the required quantity of the regenerating solution is added to the bath by keeping the valve open for an appropriate, predetermined time interval.

It has been found that impurities can deposit and thus reduce the flow cross section for the regenerating solution. When this occurs, the quantity of regenerating solution delivered per stroke of the pump and, likewise, the quantity of regenerating solution flowing through the valve per unit of time will no longer be constant. Accordingly, operation of the pump for a predetermined number of strokes or holding of the valve in an open position for a predetermined time interval will not result in delivery of the required quantity of regenerating solution to the processing bath. The same holds true if leaks are present.

OBJECTS AND SUMMARY OF THE INVENTION

It is an object of the invention to provide an arrangement which makes it possible to monitor the quantity of a regenerating agent delivered to a processing bath.

Another object of the invention is to provide an arrangement which makes it possible to maintain the strength of a processing bath substantially constant.

An additional object of the invention is to provide an arrangement which makes it possible to compensate for the introduction of an erroneous quantity of a regenerating agent into a processing bath.

A concomitant object of the invention is to provide a photographic developing apparatus in which the strength of a processing bath may be maintained substantially constant.

It is also an object of the invention to provide a method which makes it possible to monitor the delivery of a regenerating agent to a processing bath.

Yet another object of the invention is to provide a method which enables the strength of a processing bath to be maintained substantially constant.

A further object of the invention is to provide a method which makes it possible to correct for the addition of an erroneous quantity of a regenerating agent to a processing bath.

The preceding objects, as well as others which will become apparent as the description proceeds, are achieved by the invention.

One aspect of the invention resides in a processing arrangement which comprises a container accommodating a processing bath and conveying means for advancing material to be processed through the bath. Sensing means is provided for sensing the amount of material advanced through the bath. The arrangement further includes a supply vessel which accommodates a flowable regenerating agent for the bath. Regulating means constituting part of the arrangement is responsive to the sensing means and designed to deliver a predetermined quantity of the regenerating agent to the bath after a predetermined amount of material has been advanced through the bath. The regulating means includes a flow regulating device for the regenerating agent and measuring means is provided to measure the actual quantity of the regenerating agent delivered to the bath. Control means is connected with the sensing means and measuring means. The control means is operative to determine deviation of the actual quantity of the regenerating agent delivered to the bath from the predetermined or required quantity thereof and to generate a control signal when a deviation occurs.

The control means may comprise a computer. The computer may function to automatically calculate the required quantity of the regenerating agent on the basis of signals received from the sensing means.

The invention permits the regulating means to be monitored in a simple fashion. The control means or computer may be connected to the regulating means and may cause the latter to carry out a correction when the quantity of the regenerating agent supplied to the processing bath differs from the required quantity. It is further possible to provide an alarm unit which is activated by the control means when frequent or excessively large deviations of the actual quantity of the regenerating agent from the required quantity occur.

The arrangement of the invention may be simplified by providing for the control means or computer to be in the form of a microprocessor.

Another aspect of the invention resides in a processing method which involves advancing material to be processed through a processing bath and sensing the amount of material advanced through the bath. A regenerating agent is added to the processing bath subsequent to advancement of a predetermined amount of the material through the bath. The amount of material advanced through or processed in the bath is related to the quantity of regenerating agent to be added such that the aforesaid predetermined amount of material is equivalent to a predetermined quantity of the regenerating agent. The actual quantity of the regenerating agent supplied to the processing bath during the adding step is measured and compared with the aforesaid predetermined quantity of the regenerating agent. A control signal is generated upon deviation of the actual quantity of the regenerating agent from the predetermined quantity thereof.

It is possible to correct for differences between the actual and predetermined quantities of the regenerating agent and/or to generate alarm signals in response to such differences.

The invention may be advantageously applied to developing apparatus for photographic articles.

The novel features which are considered as characteristic of the invention are set forth in particular in the appended claims. The improved processing arrangement and method, however, together with additional details and advantages thereof, will be best understood upon perusal of the following detailed description of certain specific embodiments with reference to the accompanying drawing.

DESCRIPTION OF THE PREFERRED EMBODIMENTS

Figure 1:
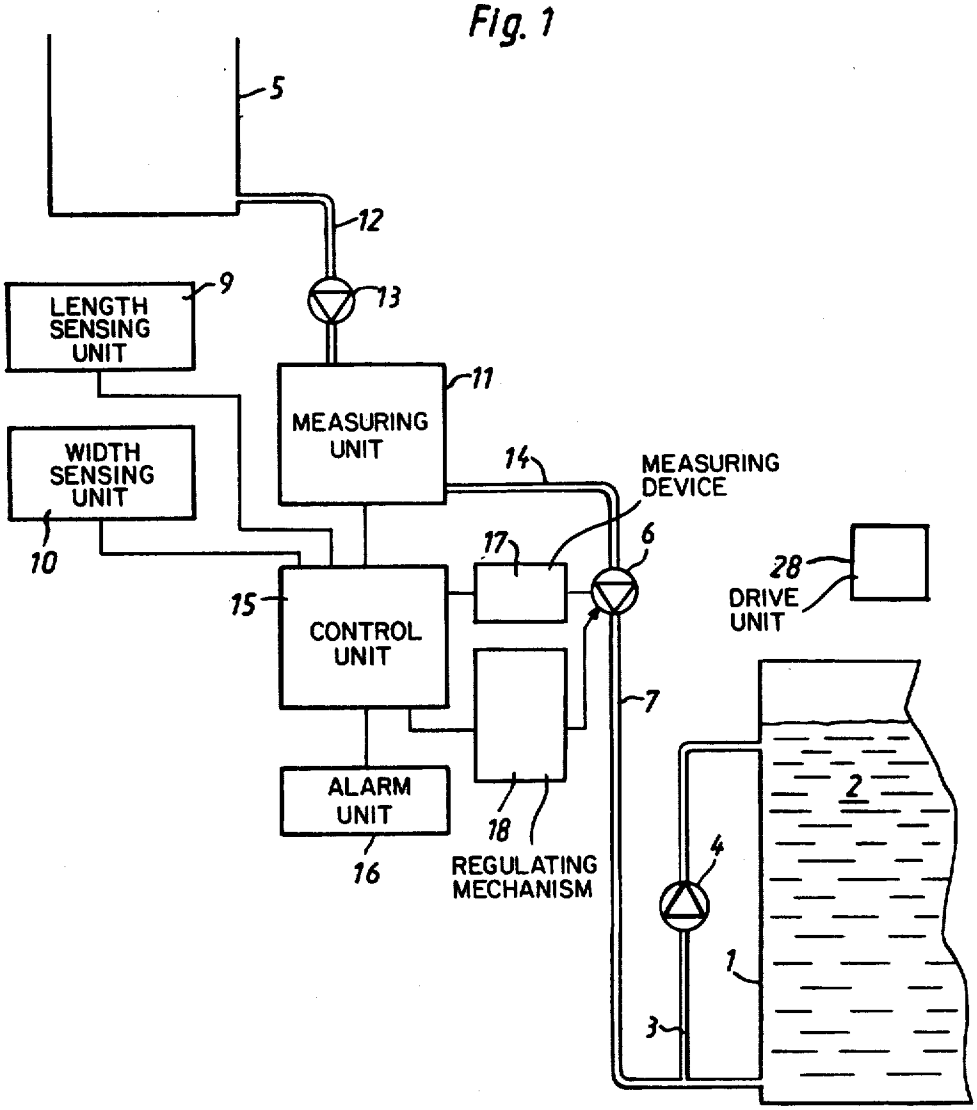
FIG. 1 diagrammatically illustrates one embodiment of a processing arrangement according to the invention.

FIG. 1 illustrates a container 1 which accommodates a processing bath 2. It is assumed here that the arrangement of FIG. 1 constitutes part of a developing apparatus for photographic or photosensitive articles and that the processing bath 2 is a developing or fixing bath. A conventional drive unit 28 is provided for advancing the non-illustrated photosensitive articles through the processing bath 2.

A pipe 3 connects the lower end of the container 1 with the upper end thereof. A pump 4 is located in the pipe 3 and serves to circulate the liquid constituting the processing bath 2.

A storage vessel 5 accommodates a regenerating solution for the processing bath 2. The regenerating solution is delivered to the pipe 3 at a location upstream of the pump 4 by a flow regulating device 6. The flow regulating device 6 communicates with the pipe 3 via a pipe 7 and is connected to the storage vessel 5 in a manner to be described below. By way of example, the flow regulating device 6 may be in the form of a pump or a solenoid valve.

The flow regulating device 6 delivers the regenerating solution to the processing bath 2 in dependence upon signals received from a control unit or control means 15, e.g. a computer or microprocessor. The control unit 15 is connected with sensing means 9,10 for sensing the surface area of the material advanced into the processing bath 2. The control unit 15 automatically calculates the quantity of the regenerating solution which must be delivered to the processing bath 2 on the basis of signals received from the sensing means 9,10. The sensing means 9,10 is constituted by a sensing unit 9 which senses the length of the material advanced into the processing bath 2 and a sensing unit 10 which senses the width of the material.

Length sensing units for sheets and strips are known. If the material to be processed in the processing bath 2 is in the form of strips, the length sensing unit 9 may, for example, be of the type described in the German Pat. No. 25 57 253. The length sensing unit described in this patent includes a memory or storage unit which is movable towards and away from the material to be sensed. Switches are located at the ends of the path of travel of the memory or storage unit, that is, at the locations where the memory or storage unit reverses its direction of travel. The time intervals between activation of the switches provide a measure of the speed of the material and the speed, in turn, is representative of the length of the material. As another example, the length sensing unit 9 may be of the known type in which a colored or slotted disc is mounted for rotation with the drive shaft which advances the material to be measured or with a roller driven by the material. The disc is optically sensed to determine its rotational speed which is a measure of the speed of advance of the material.

A variety of width measuring units are likewise known and may be used for the width measuring unit 10. For example, an infrared sensor which travels transversely to the direction of advance of the material to be measured is described in the German Pat. No. 25 57 253 mentioned above. Another width sensing unit which is particularly well-suited for films is disclosed in the German Pat. No. 28 15 162. An additional width sensing unit is known from the German Offenlegungsschrift No. 1 522 856. Here, the width of the material is sensed mechanically, optically, pneumatically or ultrasonically.

Referring once more to FIG. 1, the length sensing unit 9 and the width sensing unit 10 supply signals to the control unit 15. From these signals, the control unit 15 calculates the surface area of the material advanced into the processing bath 2. This surface area is used by the control unit 15 to determine the quantity of the regenerating solution which is to be delivered to the processing bath 2.

The control unit 15 controls the flow regulating device 6 in dependence upon the calculated quantity of the regenerating solution to be delivered to the processing bath 2. If the flow regulating device 6 is in the form of a pump, the control unit 15 may cause the flow regulating device 6 to operate for a specific number of strokes determined upon the assumption that each stroke of the flow regulating device 6 will cause a fixed amount of the regenerating solution to be supplied to the processing bath 2. Alternatively, the control unit 15 may cause the flow regulating device 6 to run for a specific period of time on the assumption that a fixed quantity of the regenerating solution passes through the flow regulating device 6 per unit of time. In the event that the flow regulating device 6 is in the form of a solenoid valve, the control unit 15 may cause the flow regulating device 6 to remain open for a specific period of time calculated from the known cross-sectional area of the flow regulating device 6 on the assumption that the flow of the regenerating solution through the flow regulating device 6 is constant.

In accordance with the invention, a measuring unit or measuring means 11 is arranged between the storage vessel 5 and the flow regulating device 6. The measuring unit 11 serves to measure the actual quantity of the regenerating solution withdrawn from the storage vessel 5 and supplied to the processing bath 2. The measuring unit 11 may, for example, be constituted by a conventional flowmeter.

The measuring unit 11 has an inlet which is connected with the storage vessel 5 via a pipe 12. A flow regulating member 13 is located in the pipe 12 and may be in the form of a pump or a solenoid valve. The measuring unit 11 further has an outlet which is connected to the flow regulating device 6 by means of a pipe 14.

The control unit 15 and the measuring unit 11 are connected to one another via a conductor which enables the control unit 15 to receive signals from the measuring unit 11. The control unit 15 controls the flow regulating device 6 by way of a regulating mechanism 18. The regulating mechanism 18 sets the operating parameter for the flow regulating device 6 as determined by the control unit 15 on the basis of the surface area of the material transported into the processing bath 2. In the case of a pump, the operating parameter may be the number of strokes or the operating time as outlined previously while, in the case of a valve, the operating parameter may be the time for which the valve remains open as also outlined previously. The operating parameter set by the regulating mechanism 18 will theoretically result in the delivery of the quantity of regenerating solution calculated from the surface area of the material to the processing bath 2.

The control unit 15 is further connected to the flow regulating device 6 via a measuring device 17 which functions to measure the operating parameter set by the regulating mechanism 18 and to convey this information to the control unit 15. Thus, the measuring device 17 may determine the number of strokes performed by or may measure the operating time of the flow regulating device 6 when the latter is in the form of a pump. On the other hand, the measuring device 17 may determine the time interval for which the flow regulating device 6 remains open when the flow regulating device 6 is in the form of a valve.

The control unit 15 is also connected with an alarm unit 16.

The arrangement of FIG. 1 operates as follows:

The pump 4 is started to circulate the liquid constituting the processing bath 2. The drive unit 28 advances photosensitive material into the processing bath 2. The photosensitive material is sensed by the sensing means 9,10 which transmits signals to the control unit 15. The control unit 15 calculates the surface area of the photosensitive material on the basis of such signals.

At certain time intervals, the control unit 15 sends a signal to the regulating mechanism 18 which then activates the flow regulating device 6. Each signal is representative of the quantity of regenerating solution which must be added to the processing bath 2. The required quantity of the regenerating solution is determined by the control unit 15 from the surface area of the photosensitive material advanced into the processing bath 2. In other words, the control unit 15 calculates the total surface area of the photosensitive material advanced into the processing bath 2 during a given time interval. Since the processing bath 2 is depleted by a specified amount per unit area of the photosensitive material processed therein, the quantity or volume of the regenerating solution is related to the surface area of the photosensitive material advanced through the processing bath 2. From this relationship, the control unit 15 determines the quantity or volume of regenerating solution required to compensate for depletion of the processing bath 2 by the photosensitive material advanced through the bath 2 during any time interval.

The signal received by the regulating mechanism 18 from the control unit 15 is representative of the quantity of regenerating solution to be supplied to the processing bath 2. This signal causes the regulating mechanism 18 to set a predetermined operating parameter for the flow regulating device 6. The operating parameter set by the regulating mechanism 18 is such as to theoretically cause the amount of regenerating solution determined by the control unit 15 to be delivered to the processing bath 2. Accordingly, the operating parameter is a measure of the quantity of regenerating solution which it is necessary to supply to the processing bath 2.

As mentioned earlier, the operating parameter may be the number of strokes performed by a pump, the operating time of a pump or the length of time for which a valve remains open.

The regulating mechanism 18 activates the flow regulating device 6 which operates in accordance with the operating parameter specified by the regulating mechanism 18. During operation of the flow regulating device 6, a certain quantity or volume of the regenerating solution is withdrawn from the storage vessel 5. The quantity or volume of the regenerating agent withdrawn from the storage vessel 5 is measured by the measuring unit 11 which sends a corresponding signal to the control unit 15. Furthermore, the operating parameter of the flow regulating device 6 is measured by the measuring device 17 which likewise transmits a signal to the control unit 15. The control unit 15 compares the signals derived from the measuring unit 11 and the measuring device 17. In other words, the control unit 15 compares the quantity of regenerating solution withdrawn from the storage vessel 5 and conveyed to the processing bath 2 with the required quantity of regenerating solution to be delivered to the processing bath 2. In this regard, it will be recalled that the signal supplied by the measuring unit 11 is representative of the actual quantity of regenerating solution delivered to the processing bath 2 while the signal supplied by the measuring device 17 is representative of the required quantity of regenerating solution to be supplied to the processing bath 2.

The arrangement is operating properly as long as the signals from the measuring unit 11 and the measuring device 17 indicate that the actual and required quantities of the regenerating solution are approximately equal. If the actual and required quantities of the regenerating solution deviate, the percentage deviation may be calculated by the control unit 15. The control unit 15 may then send a signal to the regulating mechanism 18 which causes the operating parameter of the flow regulating device 6 to be increased or decreased by a corresponding amount.

The control unit 15 may be designed to correct for differences between the actual and required quantities of the regenerating solution as above as long as such differences are smaller than a predetermined threshold value and/or as long as the deviations occur with less than a predetermined threshold frequency. When the threshold value or frequency is exceeded, the control unit 15 activates the alarm unit 16.

Figure 2:
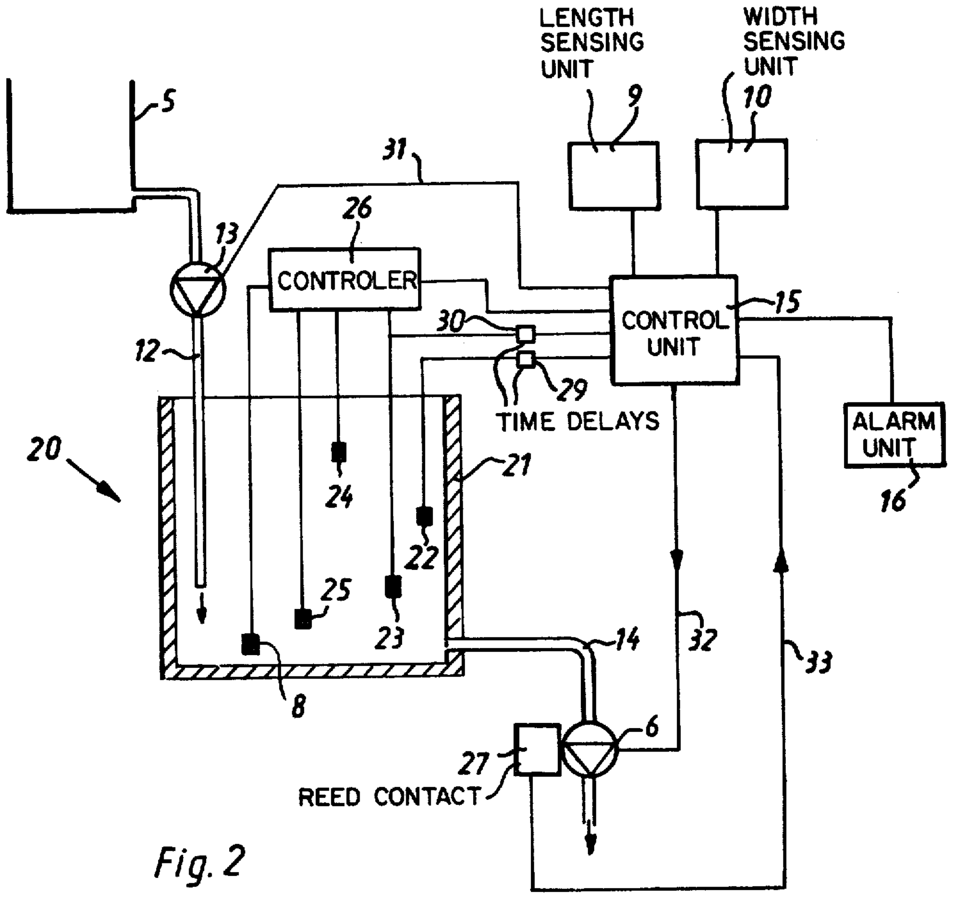
FIG. 2 diagrammatically illustrates another embodiment of a processing arrangement in accordance with the invention.

Another embodiment of the invention is illustrated in FIG. 2 where the same reference numerals as in FIG. 1 are used to identify like components.

In the embodiment of FIG. 2, a measuring unit 20 different from the measuring unit 11 of FIG. 1 is arranged between the supply vessel 5 and the flow regulating device 6. The measuring unit 20 includes an intermediate or additional vessel 21 and the pipe 12 from the supply vessel 5 opens into the intermediate vessel 21. Five electrodes 8,22,23,24 and 25 are suspended in the intermediate vessel 21. The electrodes 8,24 and 25 are connected to a controller 26 which, in turn, is connected to the control unit 15. The electrode 22 is directly connected to the control unit 15 while the electrode 23 is connected to the control unit 15 directly as well as through the controller 26. As will be explained below, the electrodes 24 and 25 may be eliminated and the direct connections between the control unit 15 and the electrodes 22 and 23 may then be replaced by connections which include respective time delay mechanisms 29 and 30.

The electrodes 8 and 22–25 are immersed in the intermediate vessel 21 to different depths. The electrode 24 is located at the smallest depth while the electrode 25 is located at a relatively great depth. The electrodes 24 and 25 constitute monitoring electrodes for monitoring the level of the bath in the intermediate vessel 21.

The electrodes 22 and 23 are located at depths between those of the monitoring electrodes 24 and 25. The electrode 23 which is connected with the control unit 15 directly as well as through the controller 26 is located at a greater depth than the electrode 22. The volume corresponding to the difference in depth between the electrodes 22 and 23 constitutes a standard volume. The electrodes 22 and 23 constitute measuring electrodes for measuring the standard volume.

The electrode 8 is located at the greatest depth and constitutes a common counterelectrode for the electrodes 22–25.

Level detecting arrangements other than the known arrangement including the electrodes 8 and 22–25 may be used for the invention.

The control unit 15 is connected with the flow regulating member 13 via a conductor 31. The control unit 15 is further directly connected with the flow regulating device 6 by means of a conductor 32. A reed element or reed contact 27 communicates with the flow regulating device 6 and is connected with the control unit 15 via a conductor 33. The reed element 27 is operative to transmit an operating parameter of the flow regulating device 6 to the control unit 15. In the event that the flow regulating device 6 is in the form of a pump, the reed element 27 may supply the control unit 15 with the number of strokes delivered by the pump or with the operating time of the pump. On the other hand, if the flow regulating device 6 is in the form of a valve, e.g. a solenoid valve, the reed element 27 may indicate to the control unit 15 and length of time for which the valve remains open.

As in FIG. 1, the control unit 15 is connected with the alarm unit 16.

The arrangement of FIG. 2 operates as follows:

The control unit 15 activates the flow regulating member 13 so that the regenerating solution in the supply vessel 5 flows into the intermediate vessel 21. When the level of the bath in the intermediate vessel 21 reaches the upper monitoring electrode 24, the flow regulating member 13 is deactivated thereby terminating the flow of the regenerating solution into the intermediate vessel 21.

Photosensitive material is now advanced through the processing bath in the developing apparatus. The length measuring unit 9 and the width measuring unit 10 send signals to the control unit 15 which determines the surface area of the photosensitive material advanced into the processing bath. The control unit 15 calculates the quantity of the regenerating solution to be supplied to the processing bath and activates the flow regulating device 6 at regular intervals to admit the regenerating solution into the processing bath.

The regenerating solution is withdrawn from the intermediate vessel 21. As a result, the level of the bath in the intermediate vessel 21 falls. When the level of the bath in the intermediate vessel 21 reaches that of the measuring electrode 22, a signal is delivered to the control unit 15 which then begins to register the operating parameter of the flow regulating device 6 as measured by the reed element 27. If the flow regulating device 6 is in the form of a pump, the control unit 15 begins to count the number of strokes delivered by the pump or to measure the operating time of the pump. If the flow regulating device 6 is in the form of a valve, the control unit 15 begins to measure the time for which the valve remains open. As soon as the level of the bath in the intermediate vessel 21 falls to that of the measuring electrode 23, the control unit 15 stops registering the operating parameter of the flow regulating device 6.

In the case of a pump, the quantity of regenerating solution delivered per stroke is known and the standard volume corresponding to the difference in depth between the measuring electrodes 22 and 23 is equivalent to a predetermined number of strokes. For example, if the standard volume is one liter and the pump delivers 50 milliters per stroke, the standard volume is equivalent to 20 strokes. A similar equivalence may be established between the operating time and the standard volume when the flow regulating device 6 is in the form of a pump and the operating time is measured or between the standard volume and the time for which the flow regulating device 6 remains open if the latter is in the form of a valve. In the event that the flow regulating device 6 is in the form of a valve and pulsed operation is used, an equivalence may be obtained between the number of pulses and the standard volume.

As outlined previously, the control unit 15 determines the quantity of regenerating solution to be supplied to the processing bath and, based upon this determination and the characteristics of the flow regulating device 6, calculates the operating parameter required to deliver this quantity of regenerating solution to the bath. However, the calculated operating parameter may be in error due to leaks or impurity deposits.

The control unit 15 determines the error, if any, in the calculated operating parameter by comparing the actual operating parameter for delivery of the standard volume to the processing bath with the theoretical operating parameter obtained from the relationship between the standard volume and the operating parameter. If the actual operating parameter is essentially equal to the theoretical operating parameter, the arrangement is operating properly. On the other hand, should the actual operating parameter deviate from the theoretical operating parameter, the control unit 15 determines the percentage deviation and corrects the previously calculated operating parameter appropriately. For example, if the actual operating parameter is 10% higher or lower than the theoretical operating parameter, the calculated operating parameter may be increased or decreased by 10%.

As described earlier, the control unit 15 may be programmed with a threshold value which, if exceeded, causes the alarm unit 16 to be activated. Thus, the control unit 15 may be programmed to activate the alarm unit 16 when the actual and theoretical operating parameters deviate from one another too frequently. Similarly, the control unit 16 may be programmed so that the alarm unit 16 is activated when the actual and theoretical operating parameters deviate by more than a predetermined percentage, e.g. 20%.

Since proper operation of the arrangement requires that there always be a supply of regenerating solution in the intermediate vessel 21, the level of the bath in the intermediate vessel 21 is monitored. As indicated earlier, the electrode 23 sends a signal to the control unit 15 when the bath level in the intermediate vessel 21 falls to the level of the electrode 23. This signal normally causes the control unit 15 to activate the flow regulating member 13 so that the intermediate vessel 21 is once again filled. The control unit 15 deactivates the flow regulating member 13 in response to a signal from the monitoring electrode 24 when the level of the regenerating solution in the intermediate vessel 21 reaches the monitoring electrode 24. If, for any reason, the intermediate vessel 21 fails to be filled in response to a signal from the measuring electrode 23, the bath level in the intermediate vessel 21 will continue to drop and fall below the level of the measuring electrode 23. When the bath level drops to the level of the electrode 25, the latter sends a signal to the controller 26 which generates an alarm.

As indicated earlier, the monitoring electrodes 24 and 25 may be eliminated. In this case, the measuring electrode 22 is connected to the control unit 15 via the time delay mechanism 29 while the measuring electrode 23 is connected to the control unit 15 by means of the time delay mechanism 30. Upon filling of the intermediate vessel 21, the time delay mechanism 29 causes the flow regulating member 13 to be deactivated at a predetermined time interval after the bath level reaches the level of the measuring electrode 22. This prevents the intermediate vessel 21 from being overfilled. On the other hand, during emptying of the intermediate vessel 21, the time delay mechanism 30 causes the flow regulating member 13 to be activated at a predetermined time interval after the bath level drops to the level of the measuring electrode 23. The time delay mechanism 30 thus insures that there is always a minimum amount of regenerating solution in the intermediate vessel 21.

The arrangement in accordance with the invention makes it possible to supply the required quantities of regenerating solution to the processing bath with great precision. The operating parameter of the flow regulating device 6 required to deliver a prescribed quantity of regenerating solution to the processing bath may be rapidly and precisely calculated in the control unit 15 from surface area measurements of the material advanced into the processing bath or from other measurements indicative of the amount of material advanced into the processing bath. In proper operation, which may occur over a relatively long time interval in conventional arrangements for delivering a regenerating solution to a processing bath, are largely eliminated according to the invention by monitoring the quantities of regenerating solution supplied to the processing bath.

The control unit 15, the alarm unit 16, the measuring device 17, the regulating mechanism 18 and the time delay mechanisms 29,30 may all be conventional.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A processing arrangement for developing photosensitive articles, comprising:

(a) a container accommodating a processing bath;

(b) conveying means for advancing material to be processed through said bath;

(c) sensing means for sensing the amount of material advanced through said bath;

(d) a supply vessel accommodating a flowable regenerating agent for said bath;

(e) regulating means responsive to said sensing means and designed to deliver a predetermined quantity of said agent to said bath after a predetermined amount of material has been advanced through said bath, said regulating means including a flow regulating device for said agent;

(f) measuring means for measuring the actual quantity of said agent delivered to said bath; and (g) control means connected with said sensing and measuring means, said control means being operative to determine deviation of said actual quantity from said predetermined quantity and to generate a control signal upon such deviation.

2. An arrangement as defined in claim 1, wherein said control means comprises a computer.

3. An arrangement as defined in claim 1, wherein said control means is connected to said regulating means and the latter is arranged to correct for said deviation in response to said control signal.

4. An arrangement as defined in claim 1, comprising an alarm unit; and wherein said control means is connected to said alarm unit and the latter is arranged to be activated in response to said control signal.

5. An arrangement as defined in claim 1, wherein said regulating means is arranged to operate at intervals.

6. An arrangement as defined in claim 1, wherein said sensing means is arranged to sense the surface area of the material advanced through said bath.

7. An arrangement as defined in claim 1, wherein said sensing means is arranged to transmit sensing signals representative of the amount of material advanced through said bath to said control means and the latter is operative to automatically calculate said predetermined quantity from said sensing signals.

8. An arrangement as defined in claim 1, wherein said regulating device is connected to said control means in such a manner that an operating parameter of said regulating device representative of said predetermined quantity is supplied to said control means.

9. An arrangement as defined in claim 8, wherein said regulating device comprises a pump and said operating parameter is the number of strokes performed by said pump during delivery of said actual quantity of said agent to said bath.

10. An arrangement as defined in claim 8, wherein said regulating device comprises a pump and said operating parameter is the operating time of said pump for delivery of said actual quantity of said agent to said bath.

11. An arrangement as defined in claim 8, wherein said regulating device comprises a valve and said operating parameter is the time for which said valve is open to deliver said actual quantity of said agent to said bath.

12. An arrangement as defined in claim 11, wherein said valve is a solenoid valve.

13. An arrangement as defined in claim 8, comprising a measuring device between said regulating device and said control means for measuring said operating parameter.

14. An arrangement as defined in claim 13, wherein said regulating means comprises a regulating mechanism between said control means and said regulating device for regulating said operating parameter in response to sensing signals emitted by said sensing means.

15. An arrangement as defined in claim 14, wherein said regulating mechanism is arranged to correct for said deviation in response to said control signal.

16. An arrangement as defined in claim 1, wherein said measuring means comprises detecting means for detecting the passage of a standard quantity of said agent.

17. An arrangement as defined in claim 16, wherein said regulating device is connected to said control means in such a manner that an operating parameter of said regulating device is supplied to said control means for the interval during which said standard quantity of said agent passes through said measuring means, said control means being operative to establish said deviation by comparing said standard quantity with said operating parameter.

18. An arrangement as defined in claim 17, wherein said regulating device comprises a pump and said operating parameter is the number of strokes performed by said pump.

19. An arrangement as defined in claim 17, wherein said regulating device comprises a pump and said operating parameter is the operating time of said pump.

20. An arrangement as defined in claim 17, wherein said regulating device comprises a valve and said operating parameter is the time for which said valve remains open.

21. An arrangement as defined in claim 16, wherein said measuring means comprises an additional vessel through which said agent flows prior to entering said regulating device, said detecting means being arranged to detect a predetermined change in the level of said agent in said additional vessel.

22. An arrangement as defined in claim 21, wherein said detecting means comprises a pair of measuring electrodes arranged at different levels of said additional vessel, the spacing between said different levels defining a standard volume.

23. An arrangement as defined in claim 21, comprising a conduit for discharging said agent from said supply vessel into said additional vessel, and a flow regulating member in said conduit.

24. An arrangement as defined in claim 23, wherein said regulating member is arranged to discharge said agent from said supply vessel into said additional vessel when said detecting means indicates that the supply of said agent in said additional vessel has fallen to a predetermined level.

25. An arrangement as defined in claim 24, wherein said regulating member is connected with said detecting means via said control means.

26. An arrangement as defined in claim 24, wherein said detecting means comprises a pair of measuring electrodes arranged at different levels of said additional vessel and the lower of said electrodes is located at said predetermined level.

27. An arrangement as defined in claim 23, comprising monitoring means for sensing predetermined maximum and minimum levels of said agent in said additional vessel.

28. An arrangement as defined in claim 27, wherein said regulating member is arranged to terminate the discharge of said agent from said supply vessel into said additional vessel when said monitoring means indicates that said maximum level has been reached.

29. An arrangement as defined in claim 28, wherein said regulating member is connected with said monitoring means via said control means.

30. An arrangement as defined in claim 27, comprising an alarm; and wherein said monitoring means is arranged to activate said alarm when the supply of said agent in said additional vessel falls to said minimum level.

31. An arrangement as defined in claim 27, wherein said monitoring means comprises a pair of monitoring electrodes in said additional vessel arranged at said maximum and minimum levels.

32. An arrangement as defined in claim 27, wherein said detecting means comprises a pair of measuring electrodes arranged at different levels of said additional vessel intermediate said maximum and minimum levels.

33. An arrangement as defined in claim 23, said detecting means comprising a first measuring electrode arranged at a first level of said additional vessel and a second measuring electrode arranged at a higher second level of said additional vessel; and wherein said measuring electrodes are connected with said regulating member by time delay means, said time delay means being operative to cause said regulating member to initiate admission of said agent into said additional vessel at a predetermined first time interval after the supply of said agent has fallen to said first level, and said time delay means being operative to cause said regulating member to terminate admission of said agent into said additional vessel at a predetermined second time interval after the supply of said agent has risen to said second level.

34. An arrangement as defined in claim 33, wherein said time delay means comprises a first time delay mechanism between said regulating member and said first measuring electrode and a second time delay mechanism between said regulating member and said second measuring electrode.

35. An arrangement as defined in claim 1, comprising a conduit for discharging said agent from said supply vessel into said measuring means, and a flow regulating member in said conduit.

36. An arrangement as defined in claim 35, wherein said flow regulating member comprises a pump.

37. An arrangement as defined in claim 35, wherein said flow regulating member comprises a valve.

38. An arrangement as defined in claim 37, wherein said valve is a solenoid valve.

39. An arrangement as defined in claim 1, wherein said regulating device is provided with circuit means for supplying information signals representative of an operating parameter of said regulating device to said control means.

40. An arrangement as defined in claim 39, wherein said circuit means comprises a reed element.

41. A processing method for developing photosensitive articles, comprising the steps of:

(a) advancing material to be processed through a processing bath;
(b) sensing the amount of material advanced through said bath;
(c) adding a regenerating agent to said bath subsequent to advancement of a predetermined amount of said material through said bath, the amount of material processed being related to the quantity of regenerating agent to be added such that said predetermined amount of material is equivalent to a predetermined quantity of said regenerating agent;
(d) measuring the actual quantity of regenerating agent added during the adding step;
(e) comparing said actual quantity with said predetermined quantity; and
(f) generating a control signal upon deviation of said actual quantity from said predetermined quantity.

42. A method as defined in claim 41, comprising the step of correcting for said deviation.

43. A method as defined in claim 41, comprising the step of generating an alarm signal in response to said control signal.

44. A method as defined in claim 41, wherein the adding step is performed at intervals.

45. A method as defined in claim 41, wherein the adding step comprises pumping said regenerating agent and the measuring step comprises counting the number of pumping strokes during delivery of said actual quantity of said regenerating agent to said bath.

46. A method as defined in claim 45, wherein said number is representative of said predetermined quantity and the comparing step comprises comparing said number and said actual quantity.

47. A method as defined in claim 41, wherein the measuring step comprises timing the delivery of said actual quantity of said regenerating agent to said bath.

48. A method as defined in claim 47, wherein the time determined during the timing step is representative of said predetermined quantity and the comparing step comprises comparing said time and said actual quantity.

49. A method as defined in claim 41, wherein the adding step comprises pumping said regenerating agent and the measuring step comprises counting the number of pumping strokes during delivery of a standard quantity of said regenerating agent to said bath.

50. A method as defined in claim 49, wherein the comparing step comprises comparing said number and said standard quantity.

51. A method as defined in claim 41, wherein the measuring step comprises timing the delivery of a standard quantity of said regenerating agent to said bath.

52. A method as defined in claim 51, wherein the comparing step comprises comparing said standard quantity and the time determined during the timing step.

* * * * *

UNITED STATES PATENT AND TRADEMARK OFFICE

CERTIFICATE OF CORRECTION

PATENT NO. : 4,480,901

DATED : November 6, 1984

INVENTOR(S) : Viktor OSEGOWITSCH et al.

It is certified that error appears in the above-identified patent and that said Letters Patent are hereby corrected as shown below:

Foremost page [75] delete "both" and insert --and Thomas Hammer, Munich, all--.

Signed and Sealed this

*Eleventh* Day of *June 1985*

[SEAL]

*Attest:*

DONALD J. QUIGG

*Attesting Officer* *Acting Commissioner of Patents and Trademarks*